(12) United States Patent
Kim et al.

(10) Patent No.: US 8,035,767 B2
(45) Date of Patent: Oct. 11, 2011

(54) LIQUID CRYSTAL DISPLAY

(75) Inventors: Dong-Gyu Kim, Yongin-si (KR); Gwang-Bum Ko, Asan-si (KR)

(73) Assignee: Samsung Electronics Co., Ltd. (KR)

( * ) Notice: Subject to any disclaimer, the term of this patent is extended or adjusted under 35 U.S.C. 154(b) by 276 days.

(21) Appl. No.: 12/500,714

(22) Filed: Jul. 10, 2009

(65) Prior Publication Data

US 2010/0066934 A1 Mar. 18, 2010

(30) Foreign Application Priority Data

Sep. 17, 2008 (KR) .................. 10-2008-0091041

(51) Int. Cl.
*G02F 1/136* (2006.01)
(52) U.S. Cl. ............... 349/48; 349/38; 349/39; 349/43; 349/144
(58) Field of Classification Search .............. 349/48, 349/144
See application file for complete search history.

(56) References Cited

U.S. PATENT DOCUMENTS

2006/0103800 A1* 5/2006 Li et al. .................. 349/129

* cited by examiner

*Primary Examiner* — Richard Kim
(74) *Attorney, Agent, or Firm* — Cantor Colburn LLP (57) ABSTRACT

A liquid crystal display includes a plurality of pixels arranged in a matrix, the pixels including a plurality of pixel electrodes each including a first subpixel electrode and a second subpixel electrode; a plurality of first thin film transistors electrically connected to the first subpixel electrodes; a plurality of second thin film transistors electrically connected to the second subpixel electrodes; a plurality of third thin film transistors electrically connected to the second subpixel electrodes; a plurality of first gate lines electrically connected to the first and second thin film transistors; a plurality of data lines electrically connected to the first and second thin film transistors; a plurality of the second gate lines electrically connected to the third thin film transistors; and a plurality of capacitance electrode lines overlapping the first and second gate lines and disposed in a same layer as a layer of the pixel electrodes, wherein drain electrodes of the third thin film transistors overlap the capacitance electrode lines.

27 Claims, 7 Drawing Sheets

LIQUID CRYSTAL DISPLAY

This application claims priority to Korean Patent Application No. 10-2008-0091041, filed on Sep. 17, 2008, and all the benefits accruing therefrom under 35 U.S.C. §119, the contents of which in its entirety are herein incorporated by reference.

BACKGROUND OF THE INVENTION (a) Field of the Invention

This disclosure relates to a liquid crystal display.

(b) Description of the Related Art

A liquid crystal display (hereinafter, referred to as an "LCD") is one of the most widely used flat panel displays. The LCD includes two display panels including electric field generating electrodes, the electric field generating electrodes including pixel electrodes and a common electrode, and a liquid crystal layer interposed between the two display panels. In the LCD, voltages are applied to the electric field generating electrode to generate an electric field in the liquid crystal layer. Due to the generated electric field, liquid crystal molecules of the liquid crystal layer align and a polarization of incident light is controlled, thereby an displaying image.

The LCD also includes switching elements electrically connected to the respective pixel electrodes, and a plurality of signal lines, including gate lines and data lines, for controlling the switching elements and applying voltages to the pixel electrodes.

A type of LCD is a vertical alignment mode LCD. In a vertical alignment mode LCD, major axes of the liquid crystal molecules are disposed so as to be vertical relative to the display panels in a state in which an electric field is not applied. The vertical alignment mode LCD has been widely used due to its high contrast ratio and wide reference viewing angle. The reference viewing angle refers to a viewing angle that is 1:10 in contrast ratio, or a critical angle of gray-to-gray luminance reversion.

One method for side visibility to approximate front visibility in a vertical alignment mode LCD is a method which causes a different transmittance from two subpixels disposed by dividing a pixel into two subpixels and applying different voltages to the two subpixels.

An exemplary method of causing different transmittance from two subpixels includes applying a same voltage to two subpixels and reducing a voltage of one of the two subpixels by using a separate switching element. In this structure, when the semiconductor layer is disposed under the data conductor, a capacitance of a capacitor is not uniform due to the semiconductor layer such that it can be difficult to control the voltage of the two subpixels.

BRIEF SUMMARY OF THE INVENTION

In an embodiment, the disclosed liquid crystal display controls a voltage of two subpixel electrodes although a semiconductor layer is disposed under a data conductor.

The above described and other drawbacks are alleviated by a liquid crystal display including a plurality of pixels arranged in a matrix, the pixels including a plurality of pixel electrodes each including a first subpixel electrode and a second subpixel electrode; a plurality of first thin film transistors electrically connected to the first subpixel electrodes; a plurality of second thin film transistors electrically connected to the second subpixel electrodes; a plurality of third thin film transistors electrically connected to the second subpixel electrodes; a plurality of first gate lines electrically connected to the first and second thin film transistors; a plurality of data lines electrically connected to the first and second thin film transistors; a plurality of the second gate lines electrically connected to the third thin film transistors; and a plurality of capacitance electrode lines overlapping the first and second gate lines and disposed in a same layer as a layer of the pixel electrodes, wherein drain electrodes of the third thin film transistors overlap the capacitance electrode lines.

The liquid crystal display may further include semiconductors disposed under the drain electrodes of the third thin film transistors, and wherein the capacitance electrode lines are disposed on the drain electrodes of the third thin film transistor.

The capacitance electrode lines may include a same material as a material of the pixel electrodes.

The liquid crystal display may further include voltage transmitting lines disposed in a same layer as a layer of the first and second gate lines, and electrically connected to the capacitance electrode lines.

The voltage transmitting lines may include a same material as a material of the first and second gate lines.

A resistance of at least one of the voltage transmitting lines may be less than a resistance of at least one of the capacitance electrode lines.

The voltage transmitting lines may include an opaque material, and the capacitance electrode lines may include a transparent material.

A width of the voltage transmitting lines may be less than a width of at least one of the capacitance electrode lines.

The liquid crystal display may further include a passivation layer disposed between the pixel electrodes, the capacitance electrode lines, and the data lines, and contact holes, wherein the capacitance electrode lines and the voltage transmitting lines may be electrically connected to each other through the contact holes, and the contact holes may be disposed per two or more pixels, the two pixels disposed adjacent to each other in a row direction.

The contact holes may be respectively disposed per three pixels, the three pixels disposed contiguously in the row direction.

The passivation layer may include an organic insulator.

The organic insulator may include a color filter.

The liquid crystal display may further include a semiconductor layer disposed between the first and second gate lines, and the data lines, wherein the semiconductor layer, except for the channel portion of the first, second, and third thin film transistors, may have substantially a same planar shape as a planar shape of the data lines.

The first and second subpixel electrodes may respectively include a plurality of minute branches, and directions of edges of the minute branches are different from each other.

The edges of the minute branches may form an angle of 45 degrees or 135 degrees with the first and second gate lines.

A common voltage may be applied to the capacitance electrode lines.

Also disclosed is a liquid crystal display including a plurality of pixels arranged in a matrix, the pixels including a substrate; a gate conductor disposed on the substrate and including a voltage transmitting line, and first, second, and third gate electrodes; a gate insulating layer disposed on the gate conductor; a semiconductor layer disposed on the gate insulating layer; an ohmic contact layer disposed on the semiconductor layer; a data conductor disposed on the ohmic contact layer and including first, second, and third source electrodes and first, second, and third drain electrodes; a passivation layer disposed on the data conductor; and a pixel electrode and a capacitance electrode line disposed on the passivation layer; wherein the capacitance electrode line overlaps the third drain electrode and the first, second and third gate electrodes, and is electrically connected to a first common voltage.

The capacitance electrode line includes a same material as a material of the pixel electrode.

A resistance of the voltage transmitting line may be less than a resistance of the capacitance electrode line.

The voltage transmitting line may include an opaque material, and the capacitance electrode line may include a transparent material.

A width of the voltage transmitting line may be less than a width of the capacitance electrode line.

The passivation layer may further include a contact hole through which the voltage transmitting line and the capacitance electrode line are electrically connected to each other, wherein the contact hole may be disposed per three neighboring pixels disposed in a row direction.

The semiconductor may have substantially a same planar shape as a planar shape of the data conductor except for a first exposed portion of the semiconductor disposed between the first source electrode and the first drain electrode, a second exposed portion of the semiconductor disposed between the second source electrode and the second drain electrode, and a third exposed portion of the semiconductor disposed between the third source electrode and the third drain electrode.

The passivation layer may further include an organic insulator.

The organic insulator may further include a color filter.

The first and second subpixel electrodes may respectively include a plurality of minute branches, and directions of edges of the minute branches may be different from each other.

The edges of the minute branches may form an angle of 45 degrees or 135 degrees with the first and second gate lines.

Accordingly, although the semiconductor layer is disposed under the data conductor, the voltages of two subpixel electrodes may be precisely selected and thereby a side visibility may be substantially the same as a front visibility.

These and other features, aspects, and advantages of the disclosed embodiments will become better understood with reference to the following description and appended claims.

BRIEF DESCRIPTION OF THE DRAWINGS

The above and other aspects, advantages, and features of the invention will become more apparent by describing in further detail exemplary embodiments thereof with reference to the attached drawings, in which.

The detailed description explains the preferred embodiments, together with advantages and features, by way of example with reference to the drawings.

DETAILED DESCRIPTION OF THE INVENTION

The present invention will be described more fully hereinafter with reference to the accompanying drawings, in which exemplary embodiments of the invention are shown. As those skilled in the art would realize, the disclosed embodiments may be modified in various different ways, all without departing from the spirit or scope of the present invention. Thus aspects, advantages, and features of the present invention and methods of accomplishing the same may be understood more readily by reference to the following detailed description of preferred embodiments and the accompanying drawings. The present invention may, however, may be embodied in many different forms, and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of the present invention.

Spatially relative terms, such as "below", "lower", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "lower" relative to other elements or features would then be oriented "above" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the present invention will be described in detail with reference to the accompanying drawings. However, the aspects, features, and advantages of the present invention are not restricted to the ones set forth herein. The above and other aspects, features, and advantages of the present invention will become more apparent to one of ordinary skill in the art to which the present invention pertains by referencing a detailed description of the present invention given below.

Figure 1:
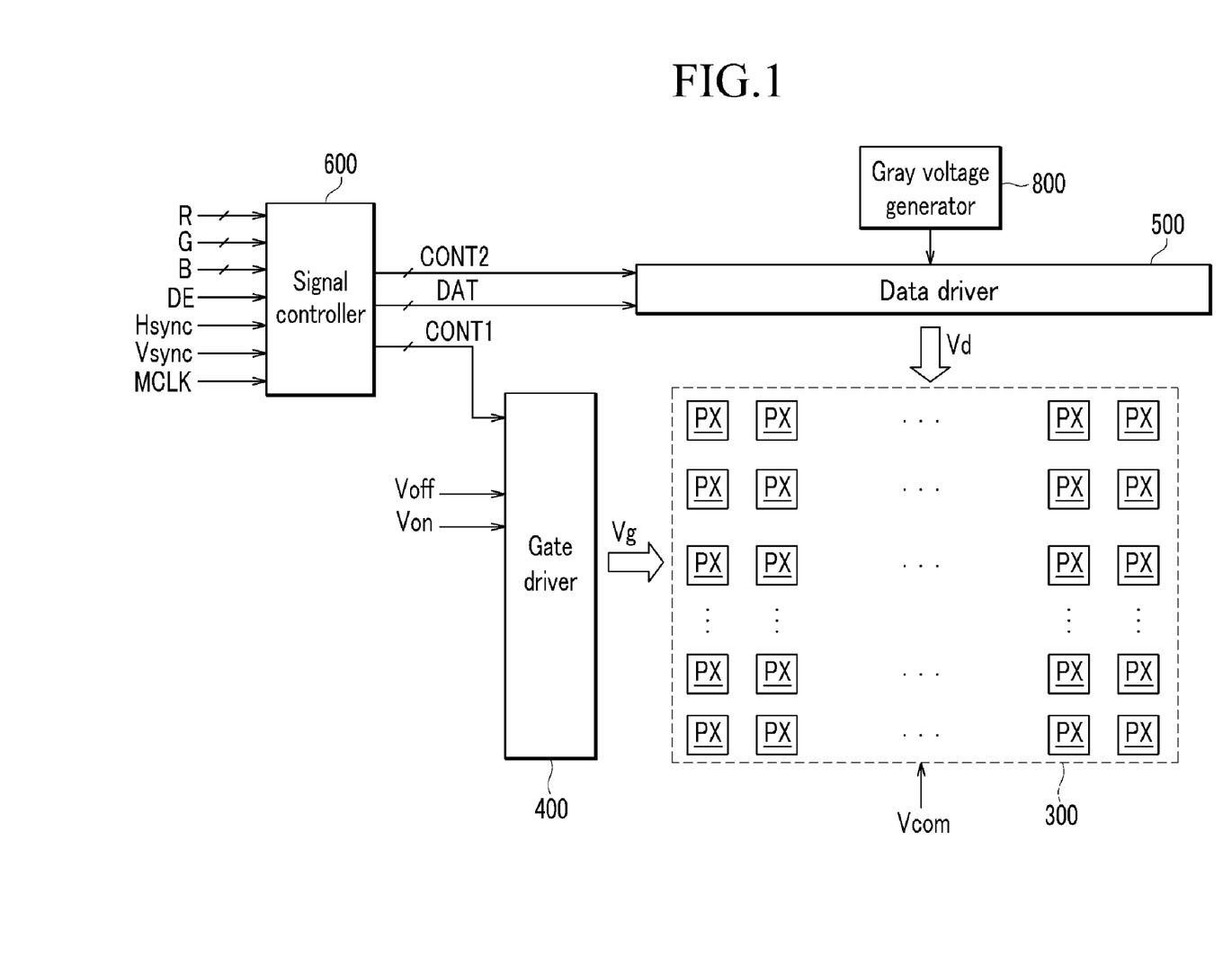
FIG. 1 is a block diagram of an exemplary embodiment of a liquid crystal display ("LCD")
Figure 2:
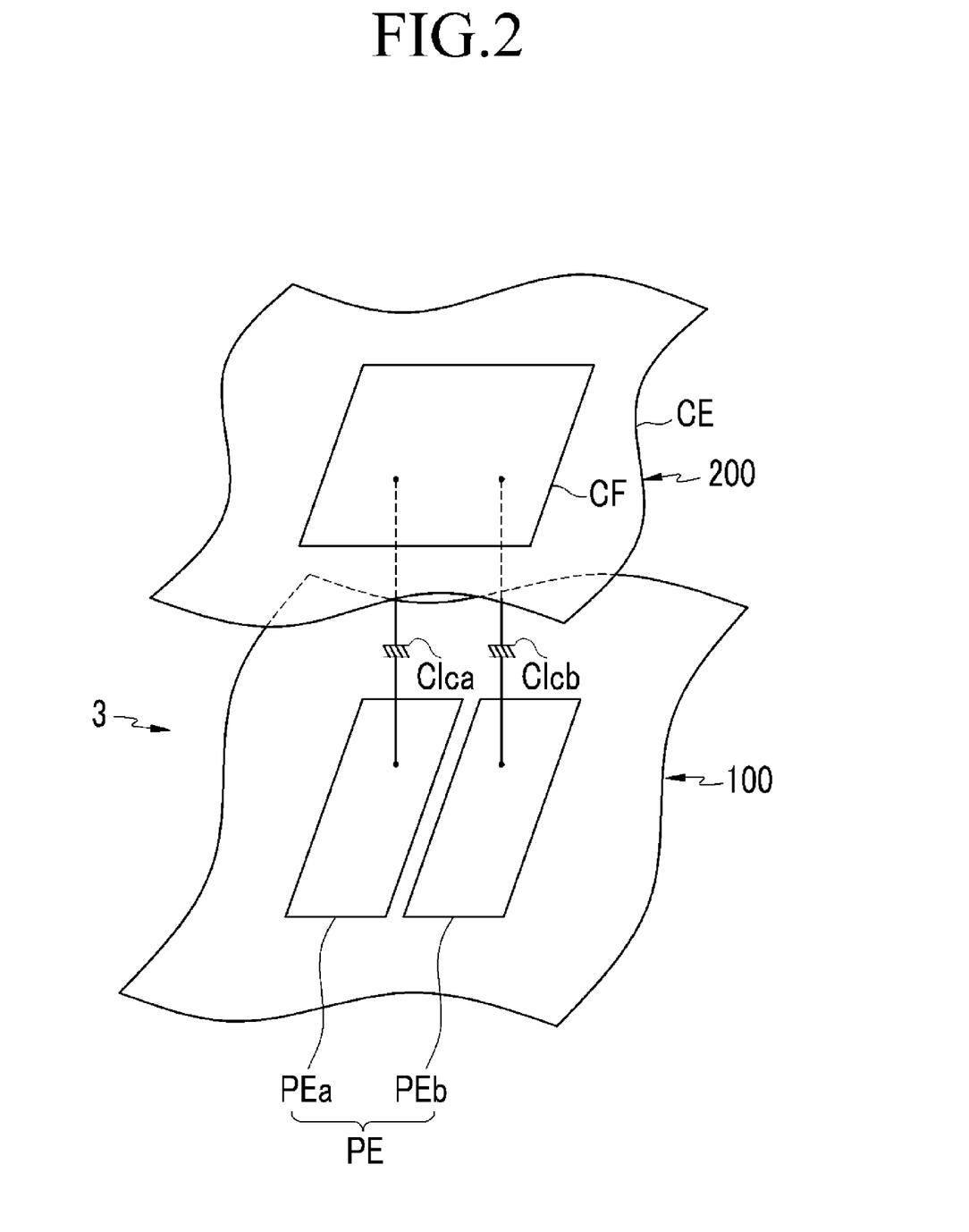
FIG. 2 is a schematic illustration of an exemplary embodiment of an LCD and an equivalent circuit of an exemplary embodiment of two subpixels.
Figure 3:
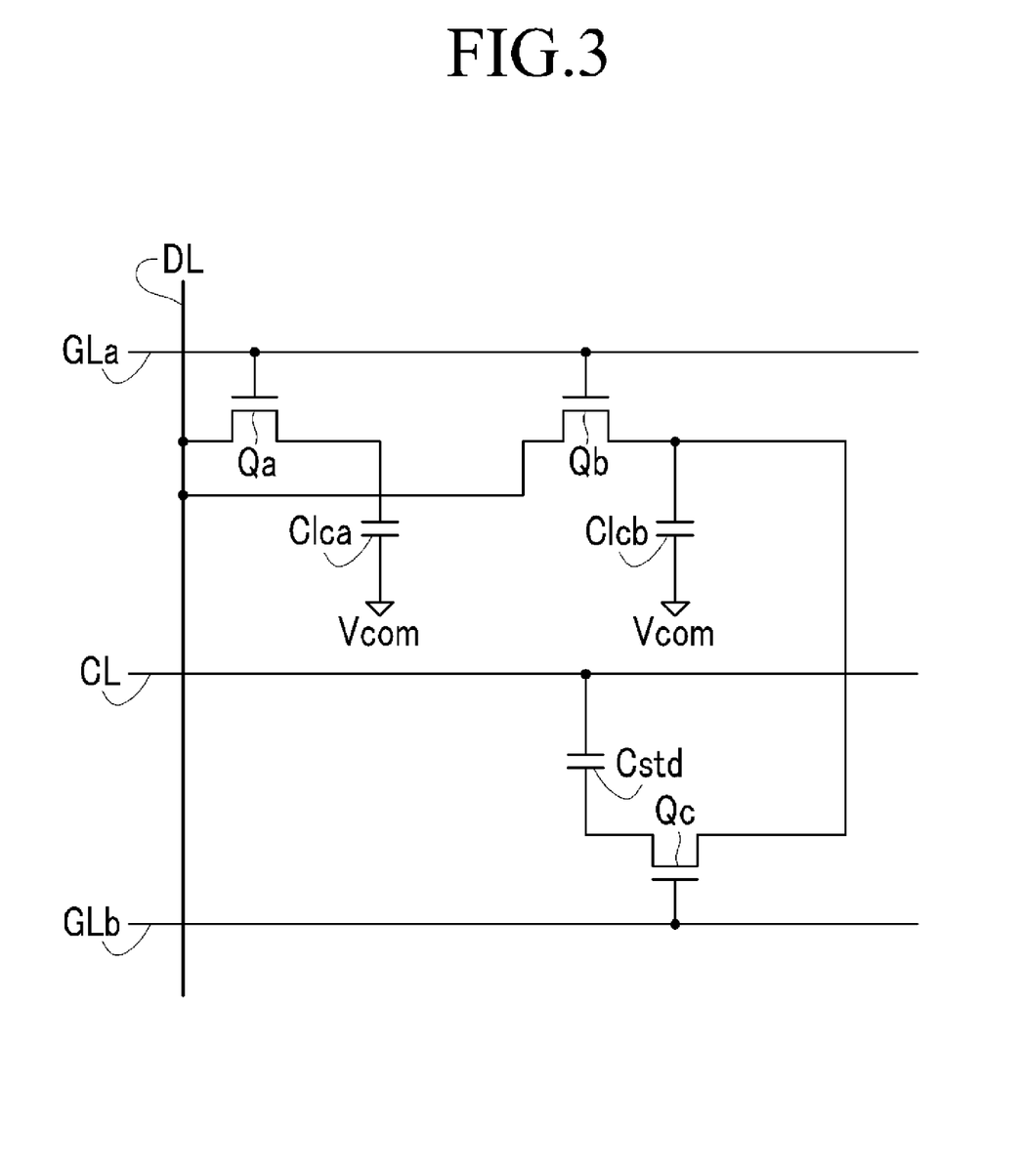
FIG. 3 is an equivalent circuit diagram of an exemplary embodiment of a pixel of an LCD.

A liquid crystal display ("LCD") according to an exemplary embodiment is described more fully herein with reference to FIG. 1 to FIG. 3.

FIG. 1 is a block diagram of an exemplary embodiment of an LCD, FIG. 2 is a schematic illustration of an exemplary embodiment of an LCD and an equivalent circuit of an exemplary embodiment of two subpixels, and FIG. 3 is an equivalent circuit diagram of an exemplary embodiment of a pixel of an LCD.

As shown in FIG. 1, an LCD according to an exemplary embodiment includes a liquid crystal panel assembly 300, a gate driver 400, a data driver 500, a gray voltage generator 800, and a signal controller 600.

The liquid crystal panel assembly 300, in a view of an equivalent circuit, includes a plurality of signal lines, including first and second gate lines GLa and GLb, data lines DL, and capacitance electrode lines CL, as shown in FIG. 3, and a plurality of pixels PX connected thereto and disposed approximately in the form of matrix. In an embodiment, as shown in FIG. 2, the liquid crystal panel assembly 300 includes a lower display panel 100 and an upper display panel 200 facing each other, and a liquid crystal layer 3 interposed therebetween.

Referring to FIG. 3, the signal lines include a plurality of first and second gate lines GLa and GLb transmitting a gate signal (also referred to as "scanning signal"), a plurality of data lines DL transmitting data voltages Vd, and a plurality of capacitance electrode lines CL transmitting a common voltage Vcom. The first and second gate lines GLa and GLb and the capacitance electrode lines CL extend in approximately a row direction and are substantially parallel to one another, and the data lines DL extend in substantially a column direction and are substantially parallel to each other.

The liquid crystal panel assembly according to an exemplary embodiment includes a plurality of pixels PX electrically connected to the signal lines.

Each of the pixels PX includes a pair of subpixels, first and second subpixels 191a and 191b, and each subpixel includes first and second liquid crystal capacitors Clca and Clcb. The first and second subpixels include first to third switching elements Qa, Qb, and Qc electrically connected to the first and second gate lines GLa and GLb, the data line DL, and the first and second liquid crystal capacitors Clca and Clcb.

The first and second liquid crystal capacitors Clca and Clcb include first and second subpixel electrodes PEa and PEb, respectively, of the lower display panel 100 and a common electrode CE of the upper display panel 200 as two terminals, respectively, and the liquid crystal layer 3 between the first and second subpixel electrodes PEa and PEb, and the common electrode CE, serves as a dielectric material. A pair of first and second subpixel electrodes PEa and PEb are separated from each other and a pixel electrode PE comprises the first and second subpixel electrodes PEa and PEb. The common electrode CE is disposed on the entire surface of the upper display panel 200, and a common voltage Vcom is applied to the common electrode CE. The liquid crystal layer 3 has a negative dielectric anisotropy, and liquid crystal molecules of the liquid crystal layer 3 may be aligned such that their major axes are perpendicular to surfaces of the upper and lower display panels when an electric field is not applied. In another embodiment, the common electrode CE may be disposed on the lower display panel 100, and at least one of the pixel electrodes PE and the common electrode CE may have a linear shape or a bar shape.

In an embodiment, in order to display a color image, each of the pixels PX uniquely displays one of primary colors (spatial division) or each of the pixels PX temporally and alternately displays primary colors (temporal division). Then, the primary colors are spatially or temporally synthesized, and thus a desired color is displayed. Exemplary primary colors include the three primary colors of red, green, and blue. FIG. 2 shows an example of spatial division. In FIG. 2, each of the pixels PX has a color filter CF representing one of the primary colors in a region of the upper display panel 200. Unlike the embodiment shown in FIG. 2, the color filter CF may be disposed above or below the first or second subpixel electrodes PEa or PEb of the lower display panel 100.

Polarizers (not shown) for polarizing light are disposed on outer surfaces of the upper and lower display panels 100 and 200, and a polarization axis of the polarizers may be crossed. One of the polarizers may be omitted in an embodiment comprising a reflective liquid crystal display. In an embodiment comprising crossed polarizers, light incident on the liquid crystal layer 3 can be blocked when an electric field is not applied.

Referring again to FIG. 1, the gray voltage generator 800 generates all gray voltages or a selected number of the gray voltages, or reference gray voltages, related to a transmittance of the pixels PX. The gray voltages or reference gray voltages may include a first set having a positive value for a common voltage Vcom, and a second set having a negative value.

The gate driver 400 is electrically connected to the first and second gate lines GLa and GLb of the liquid crystal panel assembly 300, and applies gate signals obtained by combining a gate-on voltage Von and a gate-off voltage Voff to the first and second gate lines GLa and GLb.

The data driver 500 is electrically connected to the data lines DL of the liquid crystal panel assembly 300, and selects the data signals from the gray voltage generator 800 and applies them to the data lines DL as data voltages. In an embodiment, when the gray voltage generator 800 does not supply a voltage for all grays but supplies only a selected number of reference gray voltages, the data driver 500 divides the reference gray voltages to select image data signals.

The signal controller 600 controls the gate driver 400 and the data driver 500.

Each of the drivers, comprising the gate driver 400, the data driver 500, the signal controller 600, and the gray voltage generator 800 may be directly mounted on the liquid crystal panel assembly 300 in the form of at least one integrated circuit ("IC") chip, may be mounted on a flexible printed circuit film (not shown) and then mounted on the liquid crystal panel assembly 300 in the form of a tape carrier package ("TCP"), or may be mounted on a separate printed circuit board (not shown). Alternatively, the drivers, comprising the gate driver 400, the data driver 500, the signal controller 600, and the gray voltage generator 800 may be integrated with the liquid crystal panel assembly 300 together with, for example, the signal lines, including the first and second gate lines GLa and GLb, the data lines DL, and the first to third thin film transistor switching elements Qa, Qb, and Qc. The drivers, comprising the gate driver 400, the data driver 500, the signal controller 600, and the gray voltage generator 800 may be integrated into a single chip. In this case, at least one of the drivers or at least one circuit comprising a driver may be arranged outside the single chip.

A liquid crystal panel assembly according to an exemplary embodiment is described in detail with reference to FIG. 3 to FIG. 7.

Referring to FIG. 3, the liquid crystal panel assembly according to an exemplary embodiment includes signal lines of neighboring first and second gate lines GLa and GLb, a data lines DL, and a capacitance electrode lines CL, and a plurality of pixels PX electrically connected to the signal lines.

The pixels PX include the first, second, and third switching elements Qa, Qb, and Qc, the first and second liquid crystal capacitors Clca and Clcb, and step-down capacitors Cstd.

The first and the second switching elements Qa and Qb are respectively electrically connected to the first gate lines GLa and the data lines DL, and the third switching elements Qc are electrically connected to the second gate lines GL.

The first and second switching elements Qa and Qb are three terminal elements, such as thin film transistors, and are disposed in the lower display panel 100, the control terminals of which are electrically connected to the first gates lines GLa, the input terminals of which are electrically connected to the data lines DL, and the output terminals of which are respectively electrically connected to the first and second liquid crystal capacitors Clca and Clcb.

The third switching elements Qc are also three terminal elements, such as a thin film transistor, and are disposed in the lower display panel 100, the control terminals of which are electrically connected to the second gate lines GLb, the input terminal of which are electrically connected to the second liquid crystal capacitors Clcb, and the output terminals of which are electrically connected to the step-down capacitors Cstd.

The step-down capacitors Cstd are electrically connected to the output terminals of the third switching elements Qc and the capacitance electrode lines CL, and are disposed by overlapping the capacitance electrode lines CL disposed in the lower display panel 100 and the output electrodes of the third switching elements Qc via the insulator therebetween.

The liquid crystal panel assembly shown in FIG. 3 is described in detail with reference to FIG. 4 to FIG. 7.

Figure 4:
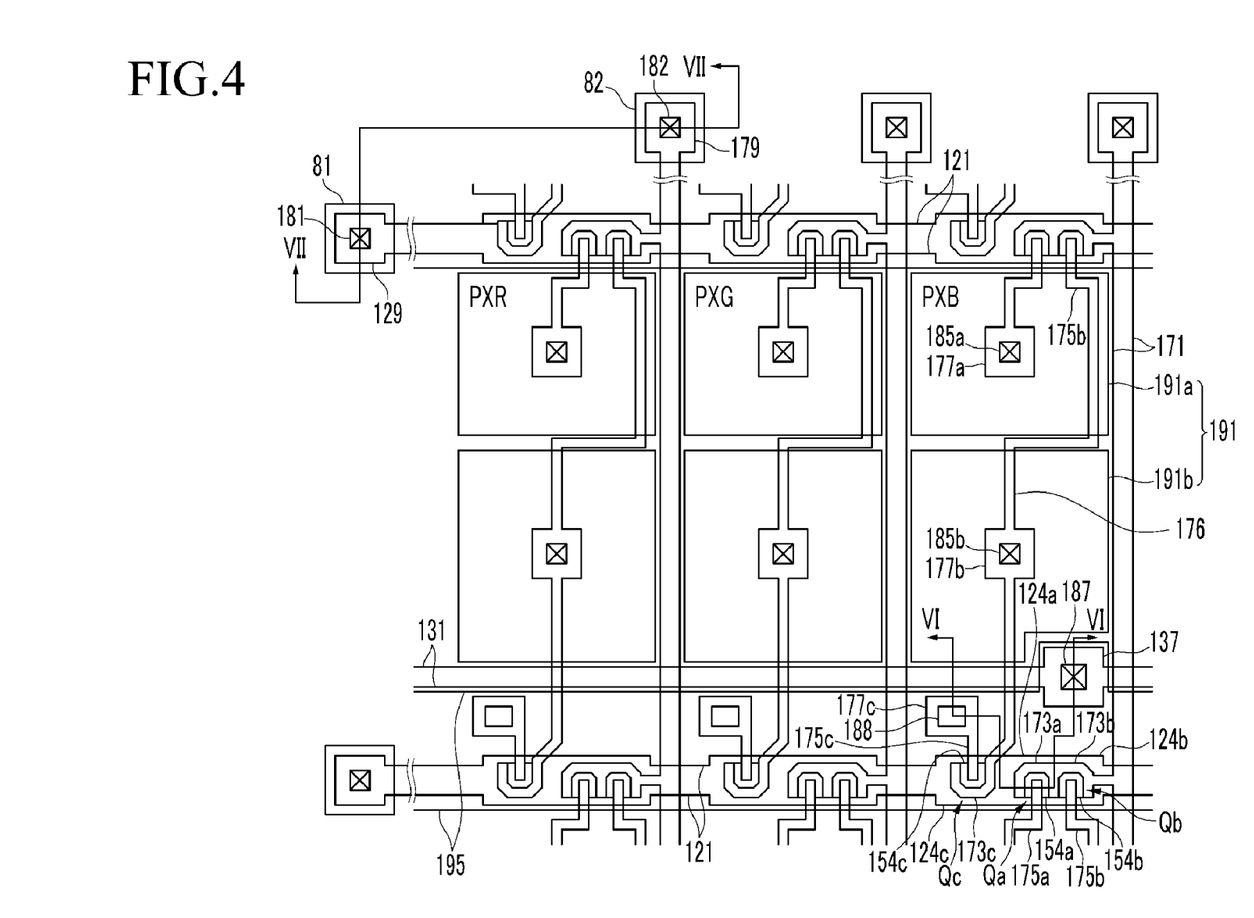
FIG. 4 is a plan view of an exemplary embodiment of a liquid crystal panel assembly.
Figure 5:
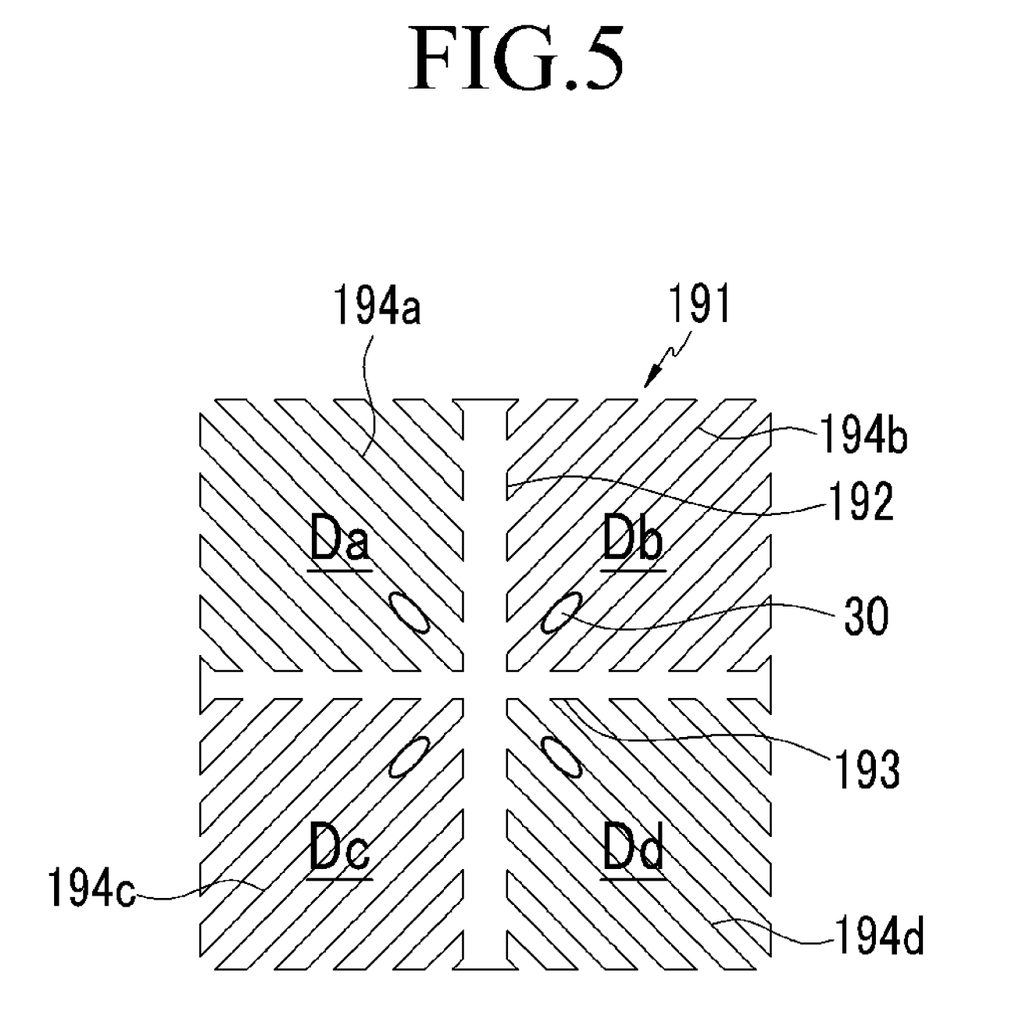
FIG. 5 is a plan view of an exemplary embodiment of a pixel electrode in a liquid crystal panel assembly.
Figure 6:
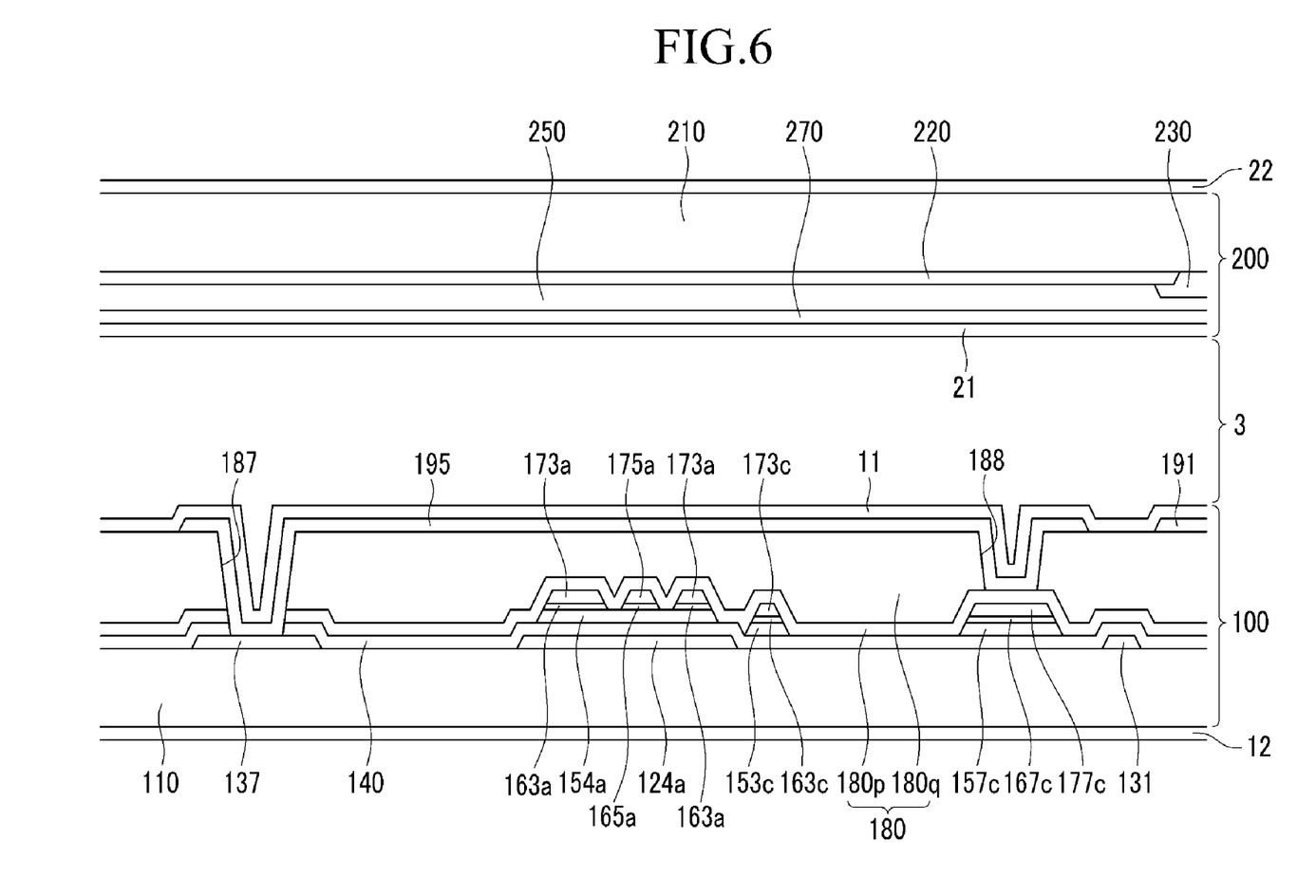
FIG. 6 and FIG. 7 are cross-sectional views of an exemplary embodiment the liquid crystal panel assembly shown in FIG. 4 taken along line VI-VI and line VII-VII, respectively.
Figure 7:
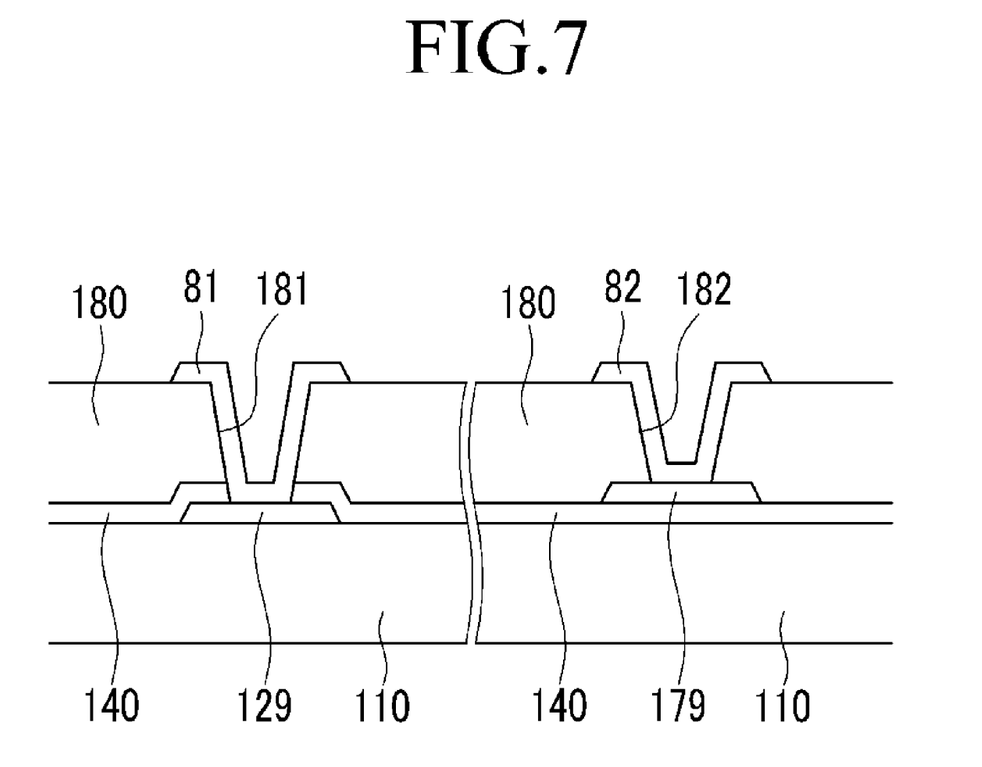

FIG. 4 is a plan view of an exemplary embodiment of a liquid crystal panel assembly, FIG. 5 is a plan view of an exemplary embodiment of a pixel electrode in the liquid crystal panel assembly shown in FIG. 4, and FIG. 6 and FIG. 7 are cross-sectional views of an exemplary embodiment of the liquid crystal panel assembly shown in FIG. 4 taken along lines VI-VI and VII-VII, respectively.

The liquid crystal display according to an exemplary embodiment includes three neighboring pixels comprising first to third color pixels PXR, PXG, and PXB, disposed in a row direction. In an embodiment, the first to third color pixels PXR, PXG, and PXB respectively represent red, green, and blue, and are referred to as dots and are units each displaying one color. Each of the first to third color pixels PXR, PXG, and PXB include the lower display panel 100 and the upper display panel 200, the liquid crystal layer 3 disposed between the upper and lower display panels 100 and 200, and a pair of polarizers, first and second polarizers 12 and 22 respectively attached on outer surfaces of the upper and lower display panels 100 and 200.

Firstly, the lower display panel 100 is described.

A plurality of gate conductors including gate lines 121 and voltage transmitting lines 131 are disposed on an insulating substrate 110. The gate lines 121 include first, second, and third gate electrodes 124a, 124b, and 124c, and first end portions 129.

The voltage transmitting lines 131 transmit a selected voltage, for example a common voltage Vcom, and include expansions 137 extending in an upward and a downward direction and have a wide area. The expansions 137 may not exist in all of the first to third color pixels PXR, PXG, and PXB, and the expansions 137 may be disposed in two or more of the first to third color pixels PXR, PXG, and PXB, and only one may be disposed among the first to third color pixels PXR, PXG, and PXB forming a dot. As shown in FIG. 4, in an embodiment the expansion 137 can be disposed only in the second pixel PXB.

A gate insulating layer 140 is disposed on the gate lines 121 and voltage transmitting lines 131. A semiconductor stripe (not shown) is disposed on the gate insulating layer 140. The semiconductor stripe includes a stem extending substantially in a longitudinal direction, and a plurality of first, second, and third branches 154a, 154b, and 154c extending toward the first, second, and third gate electrodes 124a, 124b, and 124c and the fifth branch 153c. The first, second, and third branches 154a, 154b, and 154c respectively include first to third element portions (not shown) respectively disposed on the first to third gate electrodes 124a, 124b, and 124c. The third branch 154c is extends to form a fourth branch 157c.

An ohmic contact stripe (not shown), first ohmic contact islands 165a, second ohmic contact islands (not shown), third ohmic contact islands (not shown), fourth ohmic contact islands 167c, and fifth ohmic contact islands 163c, are disposed on the first to fifth branches 154a, 154b, 154c, 157c and 153c. The ohmic contact stripe includes first protrusions 163a forming a pair along with the first ohmic contact islands 165a and disposed on the first branches 154a of the semiconductor, second protrusions (not shown) forming a pair along with the second ohmic contact islands and disposed on the second protrusions of the semiconductor, and a third protrusions (not shown) forming a pair along with the third ohmic contact islands and disposed on the third protrusions of the semiconductor.

A plurality of data conductors, including a plurality of data lines 171 and a plurality of first to third electrode members, including first drain electrodes 175a, electrode members 176, and third drain electrodes 175c are disposed on the ohmic contacts, including first protrusions 163a, first ohmic contact islands 165a, and fifth ohmic contact islands 163c, and the gate insulating layer 140.

The data lines 171 include a plurality of first and second source electrodes 173a and 173b, and second end portions 179 having a large area for contact with another layer or an external driving circuit.

The first drain electrodes 175a form a first drain electrode, the electrode members 176 include second drain electrodes 175b and third source electrodes 173c electrically connected to each other, and the third electrode members 175c form the third drain electrodes 175c.

The first, second, and third drain electrodes 175a, 175b, and 175c each include a first end portion having a wide area and a second end portion having a bar shape. The bar shaped end portions of the first, second, and third drain electrodes 175a, 175b, and 175c, respectively, are enclosed by the first, second, and third source electrodes 173a, 173b, and 173c, respectively. The third source electrodes 173c are electrically connected to the wide end portions 177b of the second drain electrodes 175b.

The semiconductors, comprising the first to fourth branches 154a, 154b, 154c, and 157c, respectively, have substantially a same planar shape as a planar shape of the data lines 171, the first to third electrode members 175a, electrode members 176, and third drain electrodes 175c, and the underlying ohmic contacts, which comprise the first protrusions 163a, the first ohmic contact islands 165a, and fourth ohmic contact islands 167c. In an embodiment, the semiconductor stripe includes exposed portions not covered by the first to third source electrodes 173a-173c and the first to third drain electrodes 175a-175c, and portions disposed between the data lines 171 and the first to third drain electrodes 175a-175c.

In the manufacturing method of the thin film transistor array panel 100 according to an exemplary embodiment, the data conductors, including the data lines 171, the first and third drain electrodes 175a and 175c, the second electrode members 176, the semiconductors, including the first to fourth branches 154a-154c and 157c, and the ohmic contacts, including the first protrusion 163a, the first ohmic contact islands 165a, and the fourth ohmic contact island 167c are disposed through a photolithography process.

A photosensitive film used in the photolithography process can have different thicknesses at different locations, and particularly includes a first portion and a second portion having a reduced thickness. The first portion is located at a wiring region provided with the data lines 171 and the first to third drain electrodes 175a, 175b, and 175c, and the second portion is located at a channel region of the thin film transistor.

There are many methods of forming the difference in thickness according to the location of the photosensitive film. An exemplary method includes disposing a photomask with a translucent area as well as a light transmitting area and a light blocking area. The translucent area is provided with a slit pattern, a lattice pattern, or a thin film having intermediate transmittance or thickness. In an embodiment utilizing a slit pattern, it can be desirable for the slit width or the space between the slits to be smaller than the resolution of exposure equipment used in the photolithography process. Another exemplary the method includes using a reflowable photosensitive film. In an embodiment, a thin portion is disposed by making a photosensitive film flow into a region where the photosensitive film is not present after forming the reflowable photosensitive film with a general exposure mask having only a light transmitting area and a light blocking area.

Since this reduces time for the photolithography process, the manufacturing method is simplified.

The first, second, and third gate electrodes 124a, 124b, and 124c, the first, second, and third source electrodes 173a, 173b, and 173c, and the first, second, and third drain electrodes 175a, 175b, and 175c respectively form the first, second, and third thin film transistors ("TFT") Qa, Qb, and Qc along with the first, second, and third branches 154a, 154b, and 154c, and the channels of the thin film transistors are respectively formed in the first to third branches 154a, 154b, and 154c between the first to third source electrodes 173a, 173b, and 173c and the first to third drain electrodes 175a, 175b, and 175c.

A passivation layer 180 is disposed on the data conductors, including the data lines 171, the first drain electrodes 175a, electrode member 176, and third drain electrode 175c and the first to third branches 154a, 154b, and 154c, which are exposed.

The passivation layer 180 includes a lower layer 180p comprising an inorganic insulator, such as silicon nitride, silicon oxide, or the like, or a combination comprising at least one of the foregoing materials, and an upper layer 180q, comprising an organic insulator. The passivation layer 180 may have a single-layered structure comprising the inorganic insulator, the organic insulator, or a combination thereof.

The passivation layer 180 has a plurality of contact holes, including first to third contact holes 182, 185a, and 185b respectively exposing the second end portions 179 of the data lines 171, first wide end portions 177a of the first drain electrodes 175a, and second wide end portions 177b of the second drain electrodes 175b. The passivation layer 180 and the gate insulating layer 140 have a plurality of contact holes, including fourth and fifth contact holes 181 and 187 respectively exposing the first end portions 129 of the gate lines 121, and the expansions 137 of the voltage transmitting lines 131. The upper layer 180q of the passivation layer 180 has openings 188 disposed on the third wide end portions 177c of the third drain electrodes 175c. The fifth contact holes 187 are disposed on the expansions 137 of the voltage transmitting lines 131, and in an embodiment only exist on a second color pixel PXB among each dot. In an embodiment, the expansions 137 of the voltage transmitting lines 131 and the openings 188 do not exist in all of a first to third color pixels PXR, PXG, and PXB, but only exist in the second color pixel PXB among each dot to thereby increase an aperture ratio of the whole liquid crystal display.

A plurality of pixel electrodes 191 including first and second subpixel electrodes 191a and 191b, a plurality of capacitance electrode lines 195, and a plurality of first and second contact assistants 81 and 82 are disposed on the passivation layer 180. The pixel electrodes 191, the capacitance electrode lines 195, and the first and second contact assistants 81 and 82 comprise a transparent material, such as indium tin oxide ("ITO"), indium zinc oxide ("IZO"), or the like, or a combination comprising at least one of the foregoing transparent materials.

The first and second subpixel electrodes 191a and 191b are adjacent to each other in a column direction, and have the branched shape as shown in FIG. 5. Referring to FIG. 5, the first and second subpixel electrodes 191a and 191b respectively include a transverse stem 193, a longitudinal stem 192 intersecting the transverse stem 193, and a plurality of first to fourth minute branches 194a, 194b, 194c, and 194d. Also, the first and second subpixel electrodes 191a and 191b are divided into a first subregion Da, a second subregion Db, a third subregion Dc, and a fourth subregion Dd by the transverse stem 193 and the longitudinal stem 192, and the first to fourth subregions Da-Dd respectively include the plurality of first, second, third, and fourth minute branches 194a, 194b, 194c, and 194d.

The first minute branch 194a obliquely extends from the transverse stem 193 or the longitudinal stem 192 in the upper-left direction, and the second minute branch 194b obliquely extends from the transverse stem 193 or the longitudinal stem 192 in the upper-right direction. Also, the third minute branch 194c obliquely extends from the transverse stem 193 or the longitudinal stem 192 in the lower-left direction, and the fourth minute branch 194d obliquely extends from the transverse stem 193 or the longitudinal stem 192 in the lower-right direction.

The first to fourth minute branches 194a-194d form an angle of about 45 degrees or about 135 degrees with the gate lines 121 or the transverse stem 193. Also, the first to fourth minute branches 194a-194d of two neighboring subregions of the first to fourth subregions Da-Dd may be perpendicular to each other.

The first and second subpixel electrodes 191a and 191b are electrically connected to the first and second drain electrodes 175a and 175b through the second and third contact holes 185a and 185b and receive data voltages Vd from the first and second drain electrodes 175a and 175b. The data voltages Vd are applied to the first and second subpixel electrodes 191a and 191b, and the common electrode 270 of the common electrode panel 200 generate an electric field, which determines an orientation of liquid crystal molecules of the liquid crystal layer 3 between pixel electrodes 191 and the common electrodes 270. Accordingly, a luminance of the light transmitted through the liquid crystal layer 3 differs depending on the selected orientation of the liquid crystal molecules.

The edges of the first to fourth minute branches 194a-194d distort the electric field, and form a horizontal component, which determines an inclined direction of liquid crystal molecules 30. The horizontal component of the electric field is substantially parallel to the edges the first to fourth minute branches 194a-194d. Accordingly, as shown in FIG. 5, liquid crystal molecules 30 are inclined in a direction substantially parallel to a length direction of the minute branches 194a-194d. In an exemplary embodiment, the length directions in which the minute branches 194a-194d extend in a pixel are all four directions such that the inclined directions of the liquid crystal molecules 30 are all four directions. Therefore, the viewing angle of the liquid crystal display is widened by varying the inclined directions of the liquid crystal molecules.

In an embodiment, the second subpixel electrode 191b is physically and electrically connected to the third source electrode 173c through the third contact hole 185b. In an embodiment, the third source electrode 173c is electrically connected to the second subpixel electrode 191b and the third source electrode 173c disposed on the next row of the first and second drain electrodes 175a and 175b, which are electrically connected to the first and second subpixel electrodes 191a and 191b.

The capacitance electrode lines 195 are parallel to the gate lines 121 and completely cover the gate lines 121, including the first to third gate electrodes 124a-c. The capacitance electrode lines 195 block electrical interference between the gate lines 121 and the pixel electrodes 191, and the gate lines 121 and the common electrode 270, such that voltage distortion of the pixel electrodes 191 and a delay of a gate signal transmitted by the gate lines 121 is reduced or substantially eliminated.

The capacitance electrode lines 195 are physically and electrically connected to the expansions 137 of the voltage transmitting lines 131 through the contact holes 187, and receive the common voltage Vcom from the voltage transmitting lines 131. The capacitance electrode lines 195 comprise a material having a lower electrical resistance than a material of the voltage transmitting lines 131, and the width of the voltage transmitting lines 131 can be less than a width of the capacitance electrode lines 195. Accordingly, the capacitance electrode lines 195 are electrically connected to the voltage transmitting lines 131, and a resistance of the voltage applied to the capacitance electrode lines 195 may be reduced.

The capacitance electrode lines 195 and the third wide end portions 177c of the third drain electrodes 175c overlap via the lower layer 180p of the passivation layer 180, thereby forming the step-down capacitor Cstd. In an embodiment, a capacitance of the step-down capacitor Cstd is greater than a capacitance of the step-down capacitor Cstd in an embodiment in which the upper layer 180q and the lower layer 180p of the passivation layer 180 both exist between the capacitance electrode lines 195 and the third wide end portion 177c of the third drain electrodes 175c.

The first and second contact assistants 81 and 82 are electrically connected to the first end portions 129 of the gate lines 121 and the second end portions 179 of the data lines 171 through the first and fourth contact holes 182 and 181, respectively. The first and second contact assistants 81 and 82 enhance adhesion of the first end portions 129 of the gate lines 121 and the second end portions 179 of the data lines 171 to external devices, and can protect them.

An alignment layer 11 is disposed on the pixel electrodes 191, the first and second contact assistants 81 and 82, the capacitance electrode lines 195, and the passivation layer 180.

The upper display panel 200 is described.

A light blocking member 220 is disposed on an insulating substrate 210. The light blocking member 220 can be a black matrix, and can reduce or prevent light leakage.

A plurality of color filters 230 can be disposed on the substrate 210. The color filters 230 can be disposed in the region adjacent to the light blocking member 220 and can extend in a longitudinal direction along a column of the pixel electrodes 191. Each of the color filters 230 can display one of the primary colors such as three primary colors of red, green, and blue.

The color filters 230 may not be present on the upper display panel 200, and may be provided on the lower display panel 100. In an embodiment, the color filters 230 may be substituted with the upper layer 180q of the passivation layer 180.

An overcoat 250 can be disposed on the color filters 230 and the light blocking member 220. A common electrode 270 is disposed on the overcoat 250. An alignment layer 21 is disposed on the common electrode 270.

The liquid crystal layer 3 can have a negative dielectric anisotropy, and the liquid crystal molecules of the liquid crystal layer 3 may be aligned so that a major axis thereof is perpendicular to a surface of the upper and lower display panels in the absence of an electric field.

The operation of the LCD according to an exemplary embodiment is described hereinafter with reference to FIG. 1 to FIG. 7.

Referring first to FIG. 1, the signal controller 600 receives R, G, and B input image signals R, G, and B and input control signals for controlling the display, from an external graphics controller (not shown). The input image signals R, G, and B include luminance information for each pixel, and the luminance has a predetermined number of grays, for example $1024=2^{10}$, $256=2^8$, or $64=2^6$ grays. Exemplary input control signals are a vertical synchronization signal Vsync, a horizontal synchronizing signal Hsync, a main clock signal MCLK, and a data enable signal DE.

The signal controller 600 processes the input image signals R, G, and B to match operating conditions of the liquid crystal panel assembly 300 based on the input image signals R, G, and B and the input control signals. Moreover, the signal controller 600 generates a gate control signal CONT1 and a data control signal CONT2 sends the gate control signal CONT1 to the gate driver 400 and sends the data control signal CONT2 and the processed image signal DAT to the data driver 500. The output image signal DAT as a digital signal has a value (or gray) of a selected number.

The data driver 500 receives the digital image signal DAT for the pixels PX of one row according to the data control signal CONT2 generated by the signal controller 600, and selects a gray voltage corresponding to each digital image signal DAT. Then, the data driver 500 converts the digital image signal DAT into an analog data voltage to apply the converted digital image signal to a relevant data line.

The gate driver 400 applies a gate-on voltage Von to the first and second gate lines GLa and GLb according to the gate control signal CONT1 generated by the signal controller 600 to turn on the first to third switching elements Qa, Qb, and Qc, which are electrically connected to the first and second gate lines GLa and GLb. In an embodiment, data voltages Vd applied to the data lines DL are applied to a relevant pixel through the turned-on first and second switching elements Qa and Qb.

A specific pixel row, for example focusing on an i-th pixel row, is described below.

A first gate signal is applied to the first gate line GLa of the i-th row, and a second gate signal is applied to the second gate line GLb. If the first gate signal is changed from a gate-off voltage Voff to a gate-on voltage Von, the first and second switching elements Qa and Qb electrically connected thereto are turned on. Accordingly, the data voltages Vd applied to the data lines DL are applied to the first and second subpixel electrodes PEa and PEb through the turned-on first and second switching elements Qa and Qb. In an embodiment, the data voltages Vd applied to the first and second subpixel electrodes PEa and PEb are the same. The first and second liquid crystal capacitors Clca and Clcb are charged with the same value as a difference between the common voltage and the data voltage Vd.

Then, when the first gate signal is changed to the gate-off voltage Voff from the gate-on voltage Von and at the same time the second gate signal is changed to the gate-on voltage Von from the gate-off voltage Voff, the first and second switching elements Qa and Qb are turned off, and the third switching element Qc is turned on. Then, electrical charges move from the second subpixel electrode PEb to the third drain electrode 175c through the third switching element Qc. For this reason, the charging voltage of the second liquid crystal capacitor Clcb is lowered, and the step-down capacitor Cstd is charged with electricity. The charging voltage of the second liquid crystal capacitor Cstb is decreased by the capacitance of the step-down capacitor Cstd such that the charging voltage of the second liquid crystal capacitor Cstb is lower than the changing voltage of the first liquid crystal capacitor Csta.

In an embodiment, the charging voltages of first and second liquid crystal capacitors Clca and Clcb show different gamma curves, and the gamma curve of a pixel voltage is a curved line synthesized from these different gamma curves. The synthetic gamma curve in the front is desirably corrected so as to conform to the most suitable reference gamma curve in the front, and the synthetic gamma curve in the side is desirably corrected so as to be extremely similar to or identical to the reference gamma curve in the front. As described above, due to conversion of the image data, side visibility is improved.

As described above, the charging voltages of the first and second liquid crystal capacitors Csta and Cstb may be controlled according to the capacitance of the step-down capacitors Cstd. Accordingly, it is desirable to correctly maintain the capacitance of the step-down capacitors Cstd. As described above, the step-down capacitors Cstd are disposed by the overlapping of the third wide end portions 177c of the third drain electrodes 175c and the capacitance electrode lines 195 via the lower layer 180p of the passivation layer 180. If the step-down capacitors Cstd are disposed by overlapping the third wide end portions 177c of the third drain electrodes 175c and portions of the gate conductors via the gate insulating layer 140, a semiconductor is disposed between two terminals of the capacitor. The semiconductor can function as an insulator or a conductor depending on a capacitance of the step-down capacitors Cstd, and thus is not uniform and the capacitance of the step-down capacitors Cstd can change. Therefore, since the charging voltage of the second liquid crystal capacitor Clcb can vary, it can be difficult to select the charging voltage of the first and second liquid crystal capacitors Clca and Clcb as intended. However, in the liquid crystal display according to an exemplary embodiment, the semiconductor is not interposed between the terminals of the step-down capacitor Cstd, therefore the capacitance of the step-down capacitor Cstd is uniform and stable, and thereby the charging voltage of the first and second liquid crystal capacitors Csta and Cstb can be precisely selected.

By repeating the above procedure by a unit of one horizontal period, which is denoted by "1H" and is equal to one period of a horizontal synchronizing signal Hsync and a data enable signal DE, data voltages Vd are applied to the pixels PX to display an image of one frame.

When the next frame starts after finishing one frame, the state of an inversion signal RVS applied to the data driver 500 can be controlled such that the polarity of the data voltages Vd applied to each pixel is opposite to that of the previous frame.

While this invention has been described in connection with exemplary embodiments, it is understood that the invention is not limited to the disclosed embodiments. In addition, many modifications can be made to adapt a particular situation or material to the teachings of this disclosure without departing from the essential scope thereof Therefore, this disclosure includes various modifications and equivalent arrangements included within the spirit and scope of the appended claims.

What is claimed is:

1. A liquid crystal display comprising a plurality of pixels arranged in a matrix, the pixels comprising:
    a plurality of pixel electrodes each comprising a first subpixel electrode and a second subpixel electrode;
    a plurality of first thin film transistors electrically connected to the first subpixel electrodes;

a plurality of second thin film transistors electrically connected to the second subpixel electrodes;
a plurality of third thin film transistors electrically connected to the second subpixel electrodes;
a plurality of first gate lines electrically connected to the first and second thin film transistors;
a plurality of data lines electrically connected to the first and second thin film transistors;
a plurality of the second gate lines electrically connected to the third thin film transistors; and
a plurality of capacitance electrode lines overlapping the first and second gate lines and disposed in a same layer as a layer of the pixel electrodes,
wherein drain electrodes of the third thin film transistors overlap the capacitance electrode lines.

2. The liquid crystal display of claim 1, further comprising semiconductors disposed under the drain electrodes of the third thin film transistors, and
wherein the capacitance electrode lines are disposed on the drain electrodes of the third thin film transistor.

3. The liquid crystal display of claim 2, wherein the capacitance electrode lines comprise a same material as a material of the pixel electrodes.

4. The liquid crystal display of claim 2, further comprising voltage transmitting lines disposed in a same layer as a layer of the first and second gate lines, and electrically connected to the capacitance electrode lines.

5. The liquid crystal display of claim 4, wherein the voltage transmitting lines comprise a same material as a material of the first and second gate lines.

6. The liquid crystal display of claim 4, wherein a resistance of at least one of the voltage transmitting lines is less than a resistance of at least one of the capacitance electrode lines.

7. The liquid crystal display of claim 6, wherein the voltage transmitting lines comprise an opaque material, and the capacitance electrode lines comprises a transparent material.

8. The liquid crystal display of claim 7, wherein a width of at least one of the voltage transmitting lines is less than a width of at least one of the capacitance electrode lines.

9. The liquid crystal display of claim 4, further comprising a passivation layer disposed between the pixel electrodes, the capacitance electrode lines, and the data lines, and contact holes,
wherein the capacitance electrode lines and the voltage transmitting lines are electrically connected to each other through the contact holes, and the contact holes are disposed per two or more pixels, the two pixels disposed adjacent to each other in a row direction.

10. The liquid crystal display of claim 9, wherein the contact holes are respectively disposed per three pixels, the three pixels disposed contiguously in the row direction.

11. The liquid crystal display of claim 9, wherein the passivation layer comprises an organic insulator.

12. The liquid crystal display of claim 11, wherein the organic insulator comprises a color filter.

13. The liquid crystal display of claim 1, further comprising:
a semiconductor layer disposed between the first and second gate lines, and the data lines, wherein
the semiconductor layer, except for the channel portion of the first, second, and third thin film transistors, has substantially a same planar shape as a planar shape of the data lines.

14. The liquid crystal display of claim 1, wherein the first and second subpixel electrodes respectively comprise a plurality of minute branches, and directions of edges of the minute branches are different from each other.

15. The liquid crystal display of claim 14, wherein the edges of the minute branches form an angle of 45 degrees or 135 degrees with the first and second gate lines.

16. The liquid crystal display of claim 1, wherein a common voltage is applied to the capacitance electrode lines.

17. A liquid crystal display including a plurality of pixels arranged in a matrix, the pixels comprising:
a substrate;
a gate conductor disposed on the substrate and comprising a voltage transmitting line and first, second, and third gate electrodes;
a gate insulating layer disposed on the gate conductor;
a semiconductor layer disposed on the gate insulating layer;
an ohmic contact layer disposed on the semiconductor layer;
a data conductor disposed on the ohmic contact layer and including first, second, and third source electrodes and first, second, and third drain electrodes;
a passivation layer disposed on the data conductor; and
a pixel electrode and a capacitance electrode line disposed on the passivation layer,
wherein the capacitance electrode line overlaps the third drain electrode and the first, second, and third gate electrodes, and is electrically connected to a first common voltage.

18. The liquid crystal display of claim 17, wherein the capacitance electrode line comprises a same material as a material of the pixel electrode.

19. The liquid crystal display of claim 18, wherein a resistance of the voltage transmitting line is less than a resistance of the capacitance electrode line.

20. The liquid crystal display of claim 19, wherein the voltage transmitting line comprises an opaque material, and the capacitance electrode line comprises a transparent material.

21. The liquid crystal display of claim 20, wherein a width of the voltage transmitting line is less than a width of the capacitance electrode line.

22. The liquid crystal display of claim 17, wherein the passivation layer further comprises a contact hole through which the voltage transmitting line and the capacitance electrode line are electrically connected to each other,
wherein the contact hole is disposed per three neighboring pixels disposed in a row direction.

23. The liquid crystal display of claim 22, wherein the semiconductor has substantially a same planar shape as a planar shape of the data conductor except for a first exposed portion of the semiconductor disposed between the first source electrode and the first drain electrode, a second exposed portion of the semiconductor disposed between the second source electrode and the second drain electrode, and a third exposed portion of the semiconductor disposed between the third source electrode and the third drain electrode.

24. The liquid crystal display of claim 23, wherein the passivation layer further comprises an organic insulator.

25. The liquid crystal display of claim 24, wherein the organic insulator further comprises a color filter.

26. The liquid crystal display of claim 17, wherein the first and second subpixel electrodes respectively comprise a plurality of minute branches, and directions of edges of the minute branches are different from each other.

27. The liquid crystal display of claim 26, wherein the edges of the minute branches form an angle of 45 degrees or 135 degrees with the first and second gate lines.

* * * * *